United States Patent
Cui et al.

(10) Patent No.: US 12,058,573 B2
(45) Date of Patent: Aug. 6, 2024

(54) DELAY REQUIREMENTS DETERMINATION FOR HANDOVER WITH PRIMARY SECONDARY CELL

(71) Applicant: APPLE INC., Cupertino, CA (US)

(72) Inventors: Jie Cui, Cupertino, CA (US); Qiming Li, Beijing (CN); Yang Tang, Cupertino, CA (US); Manasa Raghavan, Cupertino, CA (US); Xiang Chen, Cupertino, CA (US); Huaning Niu, Cupertino, CA (US); Dawei Zhang, Cupertino, CA (US); Hong He, Cupertino, CA (US); Yushu Zhang, Beijing (CN); Haitong Sun, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 372 days.

(21) Appl. No.: 17/593,182

(22) PCT Filed: Jan. 15, 2021

(86) PCT No.: PCT/CN2021/072227
§ 371 (c)(1),
(2) Date: Sep. 10, 2021

(87) PCT Pub. No.: WO2022/151377
PCT Pub. Date: Jul. 21, 2022

(65) Prior Publication Data
US 2023/0189093 A1  Jun. 15, 2023

(51) Int. Cl.
*H04W 36/00* (2009.01)
*H04W 36/08* (2009.01)

(52) U.S. Cl.
CPC ....... *H04W 36/0083* (2013.01); *H04W 36/08* (2013.01)

(58) Field of Classification Search
CPC .............................. H04W 36/00; H04W 36/08
See application file for complete search history.

(56) References Cited

U.S. PATENT DOCUMENTS

2021/0160706 A1 * 5/2021 Wu ...................... H04B 7/0695

FOREIGN PATENT DOCUMENTS

| CN | 110022588 A | 7/2019 | |
| CN | 110546992 A | 12/2019 | |
| WO | WO-2020033856 A1 * | 2/2020 | ............. H04L 5/001 |
| WO | WO-2022077451 A1 * | 4/2022 | ............. H04W 24/02 |

OTHER PUBLICATIONS

3GPP TS 38.133 , "3rd Generation Partnership Project; Technical Specification Group Radio Access Network; NR; Requirements for support of radio resource management (Release 17)", V17.0.0, Dec. 2020, 1812 pages.
Apple , "Revised WID of REL-17 NR RRM further enhancement", RP-202874 (revision of RP-202053) 3GPP TSG RAN Meeting #90-e, Electronic Meeting, Agenda Item 9.8.19, Dec. 7-11, 2020, 4 pages.
PCT/CN2021/072227 , International Search Report and Written Opinion, Oct. 19, 2021, 9 pages.

* cited by examiner

*Primary Examiner* — Kevin Kim
(74) *Attorney, Agent, or Firm* — Dorsey & Whitney LLP

(57) ABSTRACT

Provided is a method for a user equipment (UE). The method includes obtaining a processing delay for handover (HO) with primary secondary cell (PSCell) and performing a procedure of the HO with PSCell based on the obtained processing delay for the HO with PSCell.

19 Claims, 9 Drawing Sheets

DELAY REQUIREMENTS DETERMINATION FOR HANDOVER WITH PRIMARY SECONDARY CELL

TECHNICAL FIELD

This application relates generally to wireless communication systems, and more specifically to delay requirements determination for handover (HO) with primary secondary cell (PSCell).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WIMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment (UE) is provided that comprises obtaining a processing delay for handover (HO) with primary secondary cell (PSCell); and performing a procedure of the HO with PSCell based on the obtained processing delay for the HO with PSCell.

According to an aspect of the present disclosure, a method for a base station is provided that comprises determining a user equipment (UE) to perform a procedure of handover (HO) with primary secondary cell (PSCell); and obtaining a processing delay for the HO with PSCell for the UE.

According to an aspect of the present disclosure, an apparatus for a user equipment (UE) is provided that comprises one or more processors configured to perform steps of the method for the UE according to the present disclosure.

According to an aspect of the present disclosure, an apparatus fox a base station is provided that comprises one or more processors configured to perform steps of the method for the base Station according to the present disclosure.

According to an aspect of the present disclosure, a computer readable medium is provided that has computer programs stored thereon which, when executed by one or more processors, cause an apparatus to perform steps of the method according to the present disclosure.

According to an aspect of the present disclosure, an apparatus for a communication device is provided that comprises means for performing steps of the method according to the present disclosure.

According to an aspect of the present disclosure, a computer program product is provided that comprises computer programs which, when executed by one or more processors, cause an apparatus to perform steps of the method according to the present disclosure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

Figure 1:
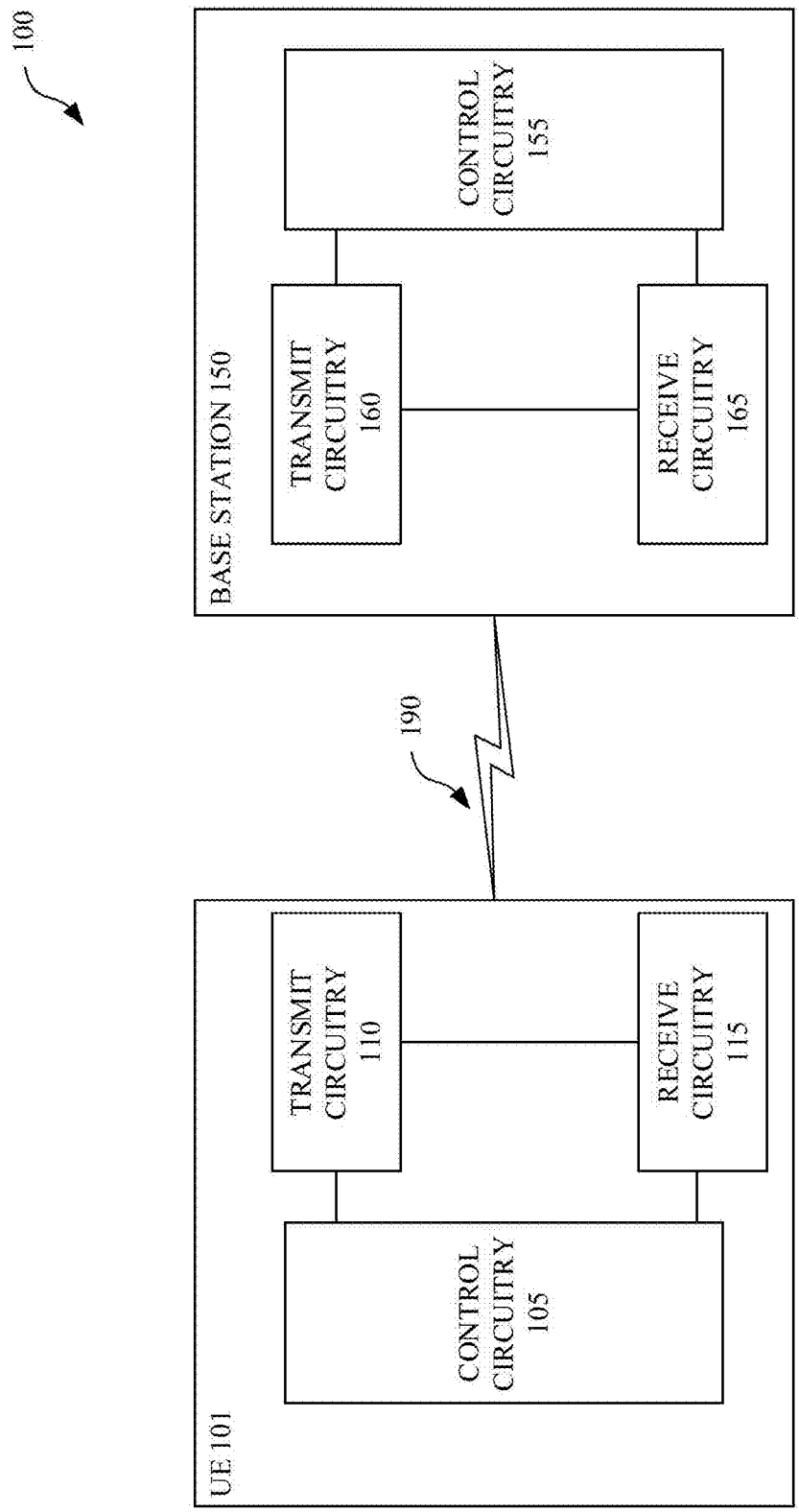
FIG. 1 is a block diagram of a system including a base station and a user equipment (UE) in accordance with some embodiments.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated. Moreover, the term "or" is intended to mean an inclusive "or" rather than an exclusive "or". That is, unless specified otherwise, or clear from context, "A or B" or "A/B" is intended to mean any of the natural inclusive permutations, that is, A, B, or both A and B. In addition, to the extent that the terms "including", "includes". "having", "has", "with", or variants thereof are used in either the detailed description and the claims, such terms are intended to be inclusive in a manner similar to the term "comprising" or "comprise."

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an ENB, an RNC and/or a gNB, such devices may be replaced with any type of base station.

In the present disclosure, in order to increase the bandwidth and thus increasing the bitrate, a user equipment (UE) may be connected to more than one serving cell. In new radio (NR), one serving cell may be designated as a primary cell (PCell), while some other cells may be secondary cells (SCells), including a Primary Secondary Cell (PSCell). In some cases, a PCell and Scells for UE may correspond to (supported by) a same base station. In some other cases, Pcell and Scells may correspond to (supported by) different base stations.

In some cases, there may be a need to handover (HO) the PCells and to change/add a PSCell for the UE. In 3GPP Rel-16, RAN2 has introduced support of handover (HO) from NR standalone (SA) to E-UTRA-NR Dual Connectivity (EN-DC). Besides the inter-Radio Access Technology (RAT) HO, RAN2 has also supported intra-RAT HO with Primary Secondary Cell (PSCell). However, no corresponding Radio Resource Management (RRM) requirements (e.g., delay requirements) for these procedures are specified in the related art.

Regarding this issue, the present disclosure aims to specify the RRM requirements (e.g., delay requirements) fox HO with PSCell, where the term "HO with PSCell" refers to HO with PSCell change or PSCell addition, ne. HO with PSCell change/addition. The scenarios of the HO with PSCell include both mater-RAT HO with PSCell and intra-RAT HO with PSCell. For example, the scenarios of the HO with PSCell for which RRM requirements are to be specified include: NR SA to EN-DC; EN-DC to EN-DC; NR-E-UTRA Dual Connectivity (NE-DC) to NE-DC; and NR-NR Dual Connectivity (NR-DC) to NR-DC.

Here, the modes such as EN-DC, NE-DC and NR-DC, etc. can be referred to as Multi-RAT Dual Connectivity (MR-DC) modes. MR-DC is a generalization of Intra-E-UTRA Dual Connectivity (DC), where a multiple receive (Rx)/transmit (Tx) capable UE may be configured to utilize resources provided by two different nodes connected via non-ideal backhaul, one providing NR access and the other one providing either E-UTRA or NR access. One node may act as a Master Node (MN) and the other way act as a Secondary Node (SN). The MN and SN may be connected via a network interface, and at least the MN is connected to the core network. The MN and/or the SN may be operated with shared spectrum channel access.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tables computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the ax Interface 190 in a base station service area provided by the base station 150. In some embodiments, such a broader network may be a wide area network operated by a cellular network provider, or may be the Internet Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beam-forming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink superframe that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and various base stations (for example, base stations that support all kinds of serving cells including PCell and SCell (e.g. PSCell), or base stations that act as the network device of PCell or SCell for communicating with the UE) described in the following embodiments may be implemented by the UE 101 and the base station 150 described in FIG. 1.

Figure 2:
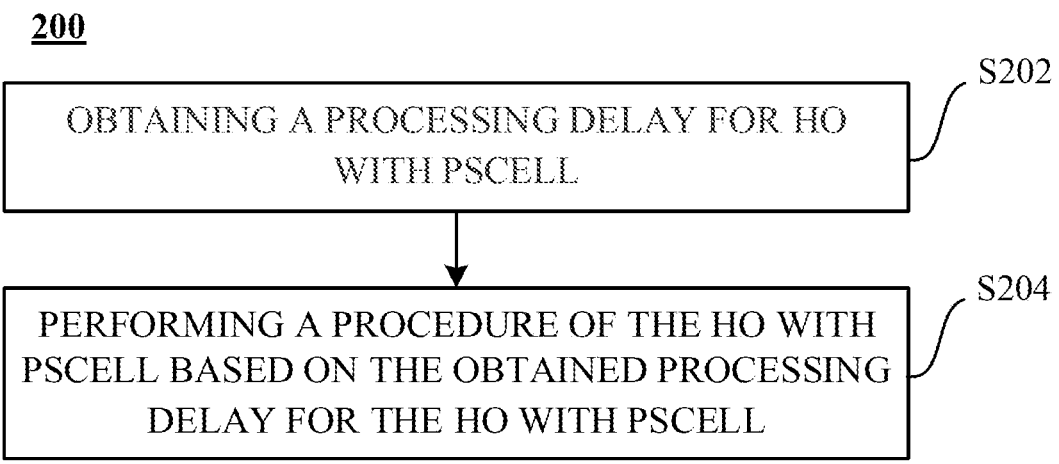
FIG. 2 illustrates a flowchart for an exemplary method for a user equipment (UE) in accordance with some embodiments.

FIG. 2 illustrates a flowchart for an exemplary method fox a user equipment in accordance with some embodiments. The method 200 illustrated in FIG. 2 may be implemented by the UE 101 described in FIG. 1.

The method 200 may begin at step S202, where the UE may obtain a processing delay for HO with PSCell. The method 200 may further include step S204, where the UE may perform a procedure of the HO with PSCell based on the obtained processing delay for the HO with PSCell.

According to some embodiments of the present disclosure, a processing delay specific to the HO with PSCell can be provided to the UE. Therefore, the UE can use the processing delay designed for the HO with PSCell, instead of the delays designed for the legacy HO and legacy PSCell change/addition, to perform the procedure of the HO with PSCell, thereby the accuracy and efficiency of the procedure of HO with PSCell can be improved, and the performance of the communication device or system can be improved accordingly.

In some embodiments, the obtained processing delay for the HO with PSCell includes at least one of a radio resource control (RRC) procedure delay for the HO with PSCell and a UE processing delay for the HO with PSCell In some embodiments, the UE processing delay (which can also be referred to as UE processing time) includes UE software (SW)/stack preparation time and radio frequency (RF) warm-up time (if needed).

As used herein, the term "delay" refers to a maximum time threshold/period that can be acceptable for processing a corresponding procedure. For example, the term "RRC procedure delay" may refer to a maximum time threshold that can be acceptable for processing an RRC signaling, and the term "UE processing delay" may refer to a maximum time threshold that can be acceptable for UE processing (including UE SW/stack preparation).

In some embodiments, the RRC procedure delay fox the HO with PSCell could be determined by a network based on RRC procedure delays for legacy HO and legacy PSCell change/addition.

For example, the UE could receive, from a network (e.g., a network device such as a base station), a first RRC procedure delay determined based on an RRC procedure delay for a separate procedure of HO) (i.e. legacy HO) between a source primary cell (PCell) and a target PCell of the HO with PSCell, and an RRC procedure delay for a separate procedure of PSCell change/addition (i.e. legacy PSCell change/addition) for the target PSCell of the HO with PSCell. The UE could then determine the received first RRC procedure delay as the RRC procedure delay for the HO with PSCell.

Note that, in the present disclosure, when describing a communication between a UE and a network (for example, transmitting to a network, receiving from a network), the communication between the UE and the network may include the communication between the UE/an apparatus of the UE and the network/a network device (node) in the network. Also note that, the expressions "network device" and the expression "node" may be used herein interchangeably. In other words, when reference is made to "network device", it also refers to "node".

In the present disclosure, the RRC procedure delay for legacy HO and the RRC procedure delay for legacy PSCell change/addition in different scenarios are summarized in the following tables 1 and 2, respectively (based on 3GPP technical specifications such as TS36.133/TS36.331/TS38.133/TS38.331).

TABLE 1

RRC procedure delay for legacy HO

| Source Cell | Target Cell | RRC procedure delay for legacy HO |
|---|---|---|
| NR (incl. FR1 and FR2) | LTE | 50 ms |
| LTE | LTE | 15 ms |
| NR (incl. FR1 and FR2) | NR (incl. FR1 and FR2) | 10 ms |

TABLE 2

RRC procedure delay for legacy PSCell change/addition

| Current PCell | Target PSCell | RRC procedure delay for legacy PSCell change/addition |
|---|---|---|
| LTE | NR (incl. FR1 and FR2) | 20 ms |
| NR FR1 | LTE | 20 ms |
| NR FR1 | NR FR2 | 16 ms |

Here, frequency Range 1 (FR1) may include frequency bands operating in sub-6 GHZ frequencies, some of which are bands that may be used by previous standards, and may potentially be extended to cover new spectrum offerings from 410 MHz to 7125 MHz. Frequency Range 2 (FR2) may include frequency bands from 24.25 GHz to $2.6 GHz. Bands in the millimeter wave (mm Wave) range of FR2 may have smaller coverage but potentially higher available bandwidth than bands in the FR1. Skilled persons will recognize these frequency ranges, which are provided by way of example, may change from time to time or from region to region.

In some embodiments, the RRC procedure delay (i.e. the first RRC procedure delay) for the HO with PSCell could be determined to be one of the following:

Option 1: the maximum value of the RRC procedure delay for the separate procedure of HO (i.e. legacy HO) and the RRC procedure delay for the separate procedure of PSCell change/addition (i.e. legacy PSCell change/addition), i.e. the RRC procedure delay (i.e. the first RRC procedure delay) for the HO with PSCell could be denoted as:

$$T_{RRC\_delay}=\mathrm{MAX}\{\text{RRC procedure delay of legacy HO}, \text{RRC procedure delay of legacy PSCell change/addition}\}.$$

According to the RRC procedure delay for legacy HO and the RRC procedure delay for legacy PSCell change/addition summarized in the above tables 1 and 2, the corresponding exemplary RRC procedure delays for different scenario modes for the HO with PSCell can be shown in the following table 3:

TABLE 3 exemplary RRC procedure delays for the HO with PSCell

| Scenario | Source PCell | Target PCell | Target PSCell | RRC procedure delay for HO with PSCell |
|---|---|---|---|---|
| NR SA to EN-DC | NR (incl. FR1 and FR2) | LTE | NR. (incl. FR1 and FR2) | 50 ms |
| EN-DC to EN-DC | LTE | LTE | NR (incl. FR1 and FR2) | 20 ms |
| NE-DC to NE-DC | NR FR1 | NR FR1 | LTE | 20 ms |
| NR-DC to NR-DC | NR FR1 | NR FR1 | NR FR2 | 16 ms |

TABLE 4 exemplary RRC procedure delays for the HO with PSCell

| Scenario | Source PCell | Target PCell | Target PSCell | RRC procedure delay for HO with PSCell |
|---|---|---|---|---|
| NR SA to EN-DC | NR (incl. FR1 and FR2) | LTE | NR (incl. FR1 and FR2) | 70 ms |
| EN-DC to EN-DC | LTE | LTE | NR (incl. FR1 and FR2) | 35 ms |
| NE-DC to NE-DC | NR FR1 | NR FR1 | LTE | 30 ms |
| NR-DC to NR-DC | NR FR1 | NR FR1 | NR FR2 | 26 ms |

Option 3: a predefined value between the RRC procedure delay for the separate procedure of HO and the RRC procedure delay for the separate procedure of PSCell change/addition.

According to the RRC procedure delay for legacy HO and the RRC procedure delay for legacy PSCell change/addition summarized in the above tables 1 and 2, the corresponding exemplary RRC procedure delays for different scenario modes for the HO with PSCell can be shown in the following table 5:

TABLE 5 exemplary RRC procedure delays for the HO with PSCell

| Scenario | Source PCell | Target PCell | Target PSCell | RRC procedure delay for HO with PSCell |
|---|---|---|---|---|
| NR SA to EN-DC | NR (incl. FR1 and FR2) | LTE | NR. (incl. FR1 and FR2) | $20 \leq T_{RRC\_delay} \leq 50$ ms |
| EN-DC to EN-DC | LTE | LTE | NR (incl. FR1 and FR2) | $15 \leq T_{RRC\_delay} \leq 20$ ms |
| NE-DC to NE-DC | NR FR1 | NR FR1 | LTE | $10 \leq T_{RRC\_delay} \leq 20$ ms |
| NR-DC to NR-DC | NR FR1 | NR FR1 | NR FR2 | $10 \leq T_{RRC\_delay} \leq 16$ ms |

Option 2: the sum value of the RRC procedure delay for the separate procedure of HO and the RRC procedure delay for the separate procedure of PSCell change/addition, i.e. the RRC procedure delay (i.e. the first RRC procedure delay) for the HO with PSCell could be denoted as:

$$T_{RRC\_delay}=\mathrm{SUM}\{\text{RRC procedure delay of legacy HO}, \text{RRC procedure delay of legacy PSCell change/addition}\}.$$

According to the RRC procedure delay for legacy HO and the RRC procedure delay for legacy PSCell change/addition summarized in the above tables 1 and 2, the corresponding exemplary RRC procedure delays for different scenario modes for the HO with PSCell can be shown in the following table 4:

Option 4: the minimum value of the RRC procedure delay for the separate procedure of HO and the RRC procedure delay for the separate procedure of PSCell change/addition, i.e. the RRC procedure delay (i.e. the first RRC procedure delay) for the HO with PSCell could be denoted as:

$$T_{RRC\_delay}=\mathrm{MIN}\{\text{RRC procedure delay of legacy HO}, \text{RRC procedure delay of legacy PSCell change/addition}\}$$

According to the RRC procedure delay for legacy HO and the RRC procedure delay for legacy PSCell change/addition summarized in the above tables 1 and 2, the corresponding exemplary RRC procedure delays for different scenario modes for the HO with PSCell can be shown in the following table 6:

TABLE 6 exemplary RRC procedure delays for the HO with PSCell

| Scenario | Source PCell | Target PCell | Target PSCell | RRC procedure delay for HO with PSCell |
|---|---|---|---|---|
| NR SA to EN-DC | NR (incl. FR1 and FR2) | LTE | NR (incl. FR1 and FR2) | 20 ms |
| EN-DC to EN-DC | LTE | LTE | NR (incl. FR1 and FR2) | 15 ms |
| NE-DC to NE-DC | NR FR1 | NR FR1 | LTE | 10 ms |
| NR-DC to NR-DC | NR FR1 | NR FR1 | NR FR2 | 10 ms |

In the present disclosure, by taking a value not greater than a sum value of the RRC procedure delay fox the separate procedure of HO and the RRC procedure delay for the separate procedure of PSCell change/addition as the RRC procedure delay for the HO with PSCell, the RRC procedure delay for the HO with PSCell could be compressed relative to the total RRC procedure delay for the legacy HO and legacy PSCell change/addition, and thus the procedure of HO with PSCell may be performed in a more efficient way, thereby improving the resource utilization rate and improving the performance of the communication device or system accordingly.

In some embodiments, the RRC procedure delay for the HO with PSCell could be determined by the UE. For example, the UE could determine a second RRC procedure delay based on a processing capability of the UE, and then could determine the second RRC procedure delay as the RRC procedure delay for the HO with PSCell.

In some embodiments, the RRC procedure delay (i.e. the second RRC procedure delay) for the HO with PSCell could be determined by the UE based on one of the following manners:

i. per UE basis, i.e., the determined second RRC procedure delay could apply for all scenario modes of HO with PSCell;

ii. per band combination (BC) of the HO with PSCell basis, i.e., a determined second RRC procedure delay for a certain BC of the HO with PSCell may not apply for other BC's; where the BC of the HO with PSCell could refer to the BC of the target PCell and the target PSCell;

iii. per scenario mode of the HO with PSCell basis, i.e., a determined second RRC procedure delay for a certain scenario mode (e.g., EN-DC to EN-DC) of HO with PSCell may not apply for other modes (e.g., NR-DC to NR DC).

In some embodiments, the possible scenario modes of the HO with PSCell include: NR SA to EN-DC; EN-DC to EN-DC; NE-DC to NE-DC; and NR-DC to NR-DC.

In some embodiments, the UE could generate, for transmission to the network device, an indication for indicating the second RRC procedure delay. As described above, the second RRC procedure delay can be generated by the UE per UE basis, per BC of the HO with PSCell basis of per scenario mode of the HO with PSCell basis, and thus the indication for indicating the second RRC procedure delay could also be generated by the UE per UE basis, per BC of the HO with PSCell basis or per scenario mode of the HO with PSCell basis.

It shall be appreciated that, the second RRC procedure delay could be any value determined based on the processing capability of the UE, and the higher the processing capability of the UE is, the lower the second RRC procedure delay could be.

By introducing a new UE capability to determine and/or indicate the RRC procedure delay for HO with PSCell, the mismatch of RRC procedure delays between the network and the UE can be avoided greatly, which thereby can further improve the procedure of HO with PSCell and the performance of the communication device or system accordingly.

In some embodiments, similar to the determination of RRC procedure delay, the UE processing delay for the HO with PSCell could be determined by the network (e.g., the network device such as the base station) based on UE processing delays for legacy HO and legacy PSCell change/addition.

For example, the UE could receive, from the network (e.g., the network device such as the base station), a first UE processing delay determined based on a UE processing delay for a separate procedure of HO (i.e. legacy HO) between a source PCell and a target PCell of the HO with PSCell, and a UE processing delay for a separate procedure of PSCell change/addition (i.e. legacy PSCell change/addition) for the target PSCell of the HO with PSCell. The UE could then determine the received first UE processing delay as the UE processing delay for the HO with PSCell.

The UE processing delay for legacy HO and the UE processing delay for legacy PSCell change/addition in different scenarios are summarized in the following tables 7 and 8, respectively (based on 3GPP technical specifications such as TS36.133/TS36.331/TS38.133/TS38.331).

TABLE 7

UE processing delay for legacy HO

| Source Cell | Target Cell | UE processing delay for legacy HO |
|---|---|---|
| NR FR1 | LTE | 20 ms |
| NR FR2 | LTE | 40 ms |
| LTE | LTE | 20 ms |
| NR FR1/FR2 | NR FR2/FR1 | 40 ms |
| NR FR1/FR2 | NR FR1/FR2 | 20 ms |

TABLE 8

UE processing delay for legacy PSCell change/addition

| Existing PCell | Target PSCell | UE processing delay for legacy PSCell change/addition |
|---|---|---|
| NR FR1 | LTE | Not specified |
| NR FR2 | LTE | Not specified |
| LTE | NR FR1 | 20 ms |
| LTE | NR FR2 | 40 ms |
| NR FR1 | NR FR2 | 40 ms |

In some embodiments, the UE processing delay (i.e. the first UE processing delay) for the HO with PSCell could be determined to be one of the following:

Option 1: the maximum value of the UE processing delay for the separate procedure of HO (i.e. legacy HO) and the UE processing delay for the separate procedure of PSCell change/addition (i.e. legacy PSCell change/addition), i.e. the UE processing delay (i.e. the first UE processing delay) for the HO with PSCell could be denoted as:

$T_{UE\_processing}$=MAX{UE processing delay of legacy HO,UE processing delay of legacy PSCell change/addition}.

Option 2: the sum value of the UTE processing delay for the separate procedure of HO and the UE processing delay for the separate procedure of PSCell change/addition, i.e. the UE processing delay (i.e. the first UE processing delay) for the HO with PSCell could be denoted as:

$T_{UE\_processing}$=SUM{UE processing delay of legacy HO,UE processing delay of legacy PSCell change/addition}.

In some embodiments, for the options 1 and 2 of the UE processing delay, the following criteria could be applied:
   i. if the target PCell is in the same RF as one of at least one old active serving cell of the UE before the HO with PSCell, the UE processing delay for the separate procedure of HO could have a first value, otherwise the UE processing delay for the separate procedure of HO could have a second value greater than the first value. For example, the first value could be set to 20 ms, and the second value could be set to 40 ms in view of the UE processing delays shown in tables 7 and 8.
   ii. if the target PSCell is in the same FR as one of the at least one old active serving cell of the UE before the HO with PSCell or as the target PCell, the UE processing delay for the separate procedure of PSCell change/addition has the first value, otherwise the UE processing delay for the separate procedure of PSCell change/addition has the second value. As described above, the first value could be set to 20 ms, and the second value could be set to 40 ms in view of the UE processing delays shown in tables 7 and 8.
   iii. if the target PSCell is a long-term evolution (LTE) cell, the UE processing delay for the HO with PSCell could be equivalent to the UE processing delay for the separate procedure of HO (i.e. the UE processing delay for the separate procedure of PSCell change/addition can be considered to be zero).

In some embodiments, the at least one old active serving cell of the UE includes the source PCell of the UE (i.e. the old active PCell of the UE) and/or the old active secondary cell(s), i.e. SCell(s) of the UE.

In an exemplary example, considering a scenario mode of EN-DC to EN-DC, i.e., the source PCell is in LTE, the target PCell is in LTE, and the target PSCell is in NR (including FR1 and FR2). Since the target PCell is in the same FR as the source PCell (one of the old active serving cell(s) before HO with PSCell), the UE processing delay for the separate procedure of HO could be 20 ms. If the target PSCell is in the same FR as an old active serving SCell, even if the target PSCell is not in the same FR as target PCell, the UE processing delay for the separate procedure of PSCell change/addition could also be 20 ms instead of 40 ms. Therefore, the UE processing delay for HO with PSCell could be:

$T_{UE\_processing}$=MAX{20 ms,20 ms}=20 ms; or $T_{UE\_processing}$=SUM{20 ms,20 ms}=40 ms By considering whether the FRs of the target PCell and/or target PSCell are the same as that of one of the old active serving cell (s) of the UE to determine the UE processing delay for the HO with PSCell, the UE processing delay for the HO with PSCell can be further compressed, and thus the procedure of HO with PSCell may be performed in a more efficient way, thereby improving the resource utilization rate and improving the performance of the communication device or system accordingly.

In some embodiments, the UE processing delay fox the separate procedure of HO could be based on UE conventional HO condition, and the UE processing delay for the separate procedure of PSCell change/addition could also be based on UE conventional PSCell change/addition condition. In this case, the above first two criteria for the options 1 and 2 of the UE processing delay could be changed to:
   i. if the target PCell is in the same RF as the source PCell of the UE before the HO with PSCell, the UE processing delay for the separate procedure of HO could have a first value, otherwise the UE processing delay for the separate procedure of HO could have a second value greater than the first value. For example, the first value could be set to 20 ms, and the second value could be set to 40 ms.
   ii. if the target PSCell is in the same FR as the target PCell, the UE processing delay for the separate procedure of PSCell change/addition has the first value, otherwise the UE processing delay for the separate procedure of PSCell change/addition has the second value.

In some embodiments, the UE processing delay (i.e. the first UE processing delay) fox the HO with PSCell could further be determined to be:

Option 3 a predefined value between a first value and a second value greater than the first value, wherein the first value and the second value are determined based on the UE processing delay for the separate procedure of HO and the UE processing delay for the separate procedure of PSCell change/addition. In some embodiments, the first value can be the minimum value of the UE processing delay for the separate procedure of HO and the UE processing delay for the separate procedure of PSCell change/addition, and the second value can be the maximum value of the UE processing delay for the separate procedure of HO and the UE processing delay for the separate procedure of PSCell change/addition. For example, the first value could be set to 20 ms, and the second value could be set to 40 ms in view of the UE processing delays shown in tables 7 and 8, and thus 20 ms≤$T_{UE\_processing}$≤40 ms.

In some embodiments, the UE processing delay fox the HO with PSCell could be determined by the UE. For example, the UE could determine a second UE processing delay based on a processing capability of the UE, and then could determine the second UE processing delay as the UE processing delay for the HO with PSCell.

In some embodiments, the UE processing delay (i.e. the second UE processing delay) for the HO with PSCell could be determined by the UE based on one of the following manners:
   i. per UE basis, i.e., the determined second UE processing delay could apply for all scenario modes of HO with PSCell;
   ii. per band combination (BC) of the HO with PSCell basis, i.e., a determined second UE processing delay for a certain BC of the HO with PSCell may not apply for other BCs; where the BC of the HO with PSCell could refer to the BC of the target PCell and the target PSCell;
   iii per scenario mode of the HO with PSCell basis, i.e., a determined second UE processing delay for a certain scenario mode (e.g., EN-DC to EN-DC) of HO with PSCell may not apply for other modes (e.g., NR-DC to NR DC).

In some embodiments, the possible scenario modes of the HO with PSCell include: NR SA to EN-DC; EN-DC to EN-DC, NE-DC to NE-DC; and NR-DC to NR-DC.

In some embodiments, the UE could generate, for transmission to the network device, an indication for indicating the second UE processing delay. In some embodiments, this indication could be generated by the UE per UE basis, per BC of the HO with PSCell basis or per scenario mode of the HO with PSCell basis.

It shall be appreciated that, the second UE processing delay could be any value determined based on the processing capability of the UE, and the higher the processing capability of the UE is, the lower the second UE processing delay could be.

By introducing a new UE capability to determine and/or indicate the UE processing delay for HO with PSCell, the mismatch of UE processing delays between the network and the UE can be avoided greatly, which thereby can further improve the procedure of HO with PSCell and the performance of the communication device or system accordingly.

It shall be further appreciated that, the indication for indicating the second UE processing delay and the indication for indicating the second RRC procedure delay could be a single indication, or different indications. For example, in the case that both the UE processing delay and the RRC procedure delay for the HO with PSCell are determined by the UE, the UE can use a single indication for indicating both the determined UE processing delay and the determined RRC procedure delay for the HO with PSCell.

Figure 3:
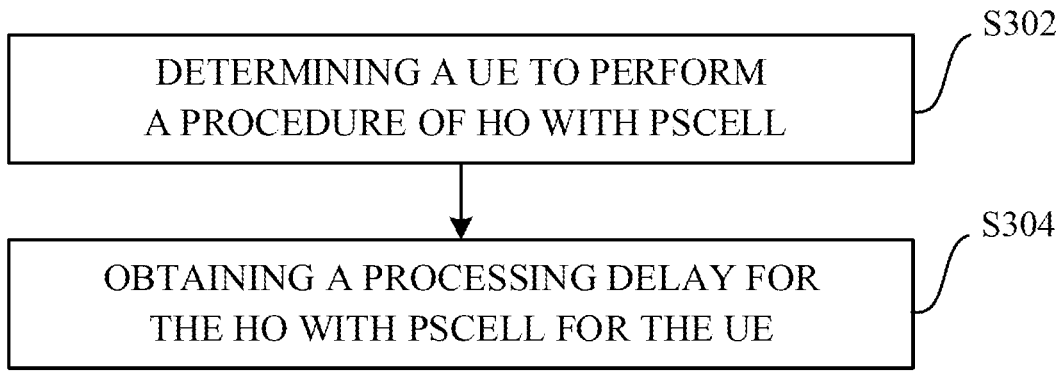
FIG. 3 illustrates a flowchart for an exemplary method for a base station in accordance with some embodiments.

FIG. 3 illustrates a flowchart for an exemplary method for a base station in accordance with some embodiments. The method 300 illustrated in FIG. 3 may be implemented by the base station 150 described in FIG. 1.

The method 300 may begin at step S302, where the base station may determine a user equipment (UE) to perform a procedure of handover (HO) with primary secondary cell (PSCell).

The method 300 may further include step 304, where the base station may obtain a processing delay for the HO with PSCell for the UE In some embodiments, the base station may determine according to the locations, mobility states, and/or measurements reports, etc. of respective UEs to determine the UE that has the need to perform the HO with PSCell.

In some embodiments, the obtained processing delay for the HO with PSCell includes a radio resource control (RRC) procedure delay for the HO with PSCell and/or a UE processing delay for the HO with PSCell In some embodiments, the RRC procedure delay for the HO with PSCell could be determined by the base station based on RRC procedure delays for legacy HO and legacy PSCell change/addition.

For example, the base station could determine a first RRC procedure delay based on an RRC procedure delay fox a separate procedure of HO (i.e. legacy HO) between a source primary cell (PCell) and a target PCell of the HO with PSCell, and an RRC procedure delay for a separate procedure of PSCell change/addition (i.e. legacy PSCell change/addition) for the target PSCell of the HO with PSCell. The base station could then determine the first RRC procedure delay as the RRC procedure delay for the HO with PSCell.

In some embodiments, the RRC procedure delay (i.e. the first RRC procedure delay) for the HO with PSCell could be determined by the base station to be one of the following:

Option 1: the maximum value of the RRC procedure delay for the separate procedure of HO and the RRC procedure delay for the separate procedure of PSCell change/addition, which could be denoted as:

$T_{RRC\_delay}$=MAX{RRC procedure delay of legacy HO,RRC procedure delay of legacy PSCell change/addition}

Option 2: the sum value of the RRC procedure delay for the separate procedure of HO and the RRC procedure delay for the separate procedure of PSCell change/addition, which could be denoted as:

$T_{RRC\_delay}$=SUM{RRC procedure delay of legacy HO,RRC procedure delay of legacy PSCell change/addition}.

Option 3 a predefined value between the RRC procedure delay fox the separate procedure of HO and the RRC procedure delay for the separate procedure of PSCell change/addition.

Option 4: the minimum value of the RRC procedure delay for the separate procedure of HO and the RRC procedure delay for the separate procedure of PSCell change/addition, which could be denoted as:

$T_{RRC\_delay}$=MIN{RRC procedure delay of legacy HO,RRC procedure delay of legacy PSCell change/addition}.

In some embodiments, the RRC procedure delay for the HO with PSCell could be determined by the UE. For example, the base station could receive, from the UE, a second RRC procedure delay determined by the UE based on a processing capability of the UE, and then could determine the second RRC procedure delay as the RRC procedure delay for the HO with PSCell In some embodiments, the RRC procedure delay (i.e. the second RRC procedure delay) for the HO with PSCell could be determined by the UE based on one of the following manners:
i. per UE basis, i.e., the determined second RRC procedure delay could apply for all scenario modes of HO with PSCell;
ii. per band combination (BC) of the HO with PSCell basis, i.e., a determined second RRC procedure delay for a certain BC of the HO with PSCell may not apply for other BCs: where the BC of the HO with PSCell could refer to the BC of the target PCell and the target PSCell;
iii. per scenario mode of the HO with PSCell basis, i.e., a determined second RRC procedure delay for a certain scenario mode (e.g., EN-DC to EN-DC) of HO with PSCell may not apply for other modes (e.g., NR-DC to NR DC).

In some embodiments, the possible scenario modes of the HO with PSCell include: NR SA to EN-DC: EN-DC to EN-DC, NE-DC to NE-DC; and NR-DC to NR-DC.

In some embodiments, the base station could receive, from the UE, an indication for indicating the second RRC procedure delay. In some embodiments, the indication for indicating the second RRC procedure delay could be generated by the UE per LE basis, per BC of the HO with PSCell basis or per scenario mode of the HO with PSCell basis.

In some embodiments, similar to the determination of RRC procedure delay, the UE processing delay for the HO with PSCell could be determined by the base station based on UE processing delays for legacy HO and legacy PSCell change/addition. For example, the base station could determine a first UE processing delay based on a UE processing delay for a separate procedure of HO (i.e. legacy HO)

between a source PCell and a target PCell of the HO with PSCell, and a UE processing delay for a separate procedure of PSCell change/addition (i.e. legacy PSCell change/addition) for the target PSCell of the HO with PSCell. The base station could then determine the first UE processing delay as the UE processing delay for the HO with PSCell.

In some embodiments, the UE processing delay (i.e. the first UE processing delay) for the HO with PSCell could be determined by the base station to be one of the following:

Option 1: the maximum value of the UE processing delay for the separate procedure of HO and the UE processing delay for the separate procedure of PSCell change/addition, which could be denoted as $T_{UE\_processing}$=MAX{UE processing delay of legacy HO,UE processing delay of legacy PSCell change/addition}.

Option 2: the sum value of the UE processing delay for the separate procedure of HO and the UE processing delay for the separate procedure of PSCell change/addition, which could be denoted as:

$T_{UE\_processing}$=SUM{UE processing delay of legacy HO,UE processing delay of legacy PSCell change/addition}.

In some embodiments, for the options 1 and 2 of the UE processing delay, the following criteria could be applied:
  i. if the target PCell is in the same RF as one of at least one old active serving cell of the UE before the HO with PSCell, the UE processing delay for the separate procedure of HO could have a first value, otherwise the UE processing delay for the separate procedure of HO could have a second value greater than the first value. For example, the first value could be set to 20 ms, and the second value could be set to 40 ms.
  ii. if the target PSCell is in the same FR as one of the at least one old active serving cell of the UE before the HO with PSCell or as the target PCell, the UE processing delay for the separate procedure of PSCell change/addition has the first value, otherwise the UE processing delay for the separate procedure of PSCell change/addition has the second value.
  iii. if the target PSCell is a long-term evolution (LTE) cell, the UE processing delay for the HO with PSCell is equivalent to the UE processing delay for the separate procedure of HO.

In some embodiments, the at least one old active serving cell of the UE includes the source PCell of the UE (i.e. the old active PCell of the UE) and/or the old active secondary cell(s), i.e. SCell(s) of the UE.

In some embodiments, the UE processing delay for the separate procedure of HO could be based on UE conventional HO condition, and the UE processing delay for the separate procedure of PSCell change/addition could also be based on UE conventional PSCell change/addition condition. In this case, the above first two criteria for the options 1 and 2 of the UE processing delay could be changed to
  i. if the target PCell is in the same RF as the source PCell of the UE before the HO with PSCell, the UE processing delay for the separate procedure of HO could have a first value, otherwise the UE processing delay for the separate procedure of HO could have a second value greater than the first value. For example, the first value could be set to 20 ms, and the second value could be set to 40 ms.
  ii. if the target PSCell is in the same PR as the target PCell, the UE processing delay for the separate procedure of PSCell change/addition has the first value, otherwise the UE processing delay for the separate procedure of PSCell change/addition has the second value.

In some embodiments, the UE processing delay (i.e. the first UE processing delay) for the HO with PSCell could further be determined to be:

Option 3: a predefined value between a first value and a second value greater than the first value, wherein the first value and the second value are determined based on the UE processing delay for the separate procedure of HO and the UE processing delay for the separate procedure of PSCell change/addition. For example, the first value could be set to 20 ms, and the second value could be set to 40 ms, and thus 20 ms≤$T_{UE\_processing}$≤40 ms In some embodiments, the UE processing delay for the HO with PSCell could be determined by the UE. For example, the base station could receive, from the UE, a second UE processing delay determined by the UE based on a processing capability of the UE, and then could determine the second UE processing delay as the UE processing delay for the HO with PSCell.

In some embodiments, the UE processing delay (i.e. the second UE processing delay) for the HO with PSCell could be determined by the UE based on one of the following manners:
  i. per UE basis, i.e., the determined second UE processing delay could apply for all scenario modes of HO with PSCell;
  ii. per band combination (BC) of the HO with PSCell basis, i.e., a determined second UE processing delay for a certain BC of the HO with PSCell may not apply for other BCs; where the BC of the HO with PSCell could refer to the BC of the target PCell and the target PSCell;
  iii. per scenario mode of the HO with PSCell basis, i.e., a determined second UE processing delay for a certain scenario mode (e.g., EN-DC to EN-DC) of HO with PSCell may not apply for other modes (e.g., NR-DC to NR DC).

In some embodiments, the possible scenario modes of the HO with PSCell include: NR SA to EN-DC; EN-DC to EN-DC: NE-DC to NE-DC; and NR-DC to NR-DC.

In some embodiments, the base station could receive, from the UE, an indication for indicating the second UE processing delay. In some embodiments, this indication could be generated by the UE per UE basis, per BC of the HO with PSCell basis or per scenario mode of the HO with PSCell basis.

It shall be appreciated that, the indication for indicating the second UE processing delay and the indication for indicating the second RRC procedure delay could be a single indication, or different indications. For example, in the case that both the UE processing delay and the RRC procedure delay for the HO with PSCell are determined by the UE, the UE can use a single indication for indicating both the determined UE processing delay and the determined RRC procedure delay for the HO with PSCell.

Figure 4:
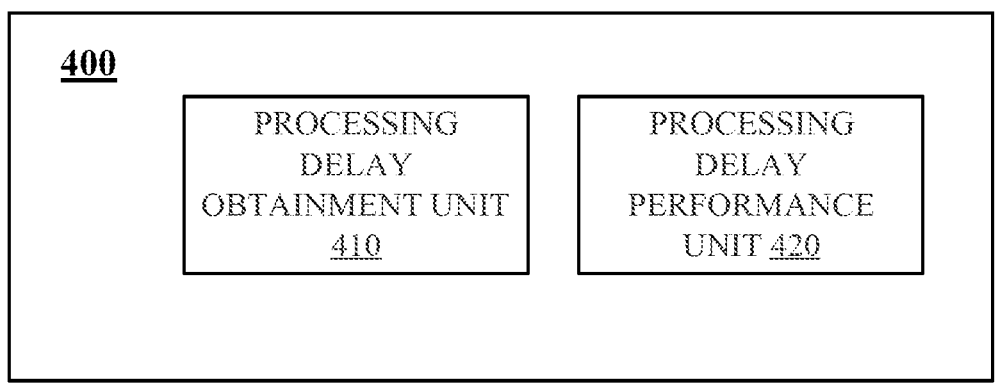
FIG. 4 illustrates an exemplary block diagram of an apparatus for a user equipment (UE) in accordance with some embodiments.

FIG. 4 illustrates an exemplary block diagram of an apparatus for a user equipment (UE) in accordance with some embodiments. The apparatus 400 illustrated m FIG. 4 may be used to implement the method 200 as illustrated in combination with FIG. 2.

As illustrated in FIG. 4, the apparatus 400 includes a processing delay obtainment unit 410 and a processing delay performance unit 420.

The processing delay obtainment unit 410 may be configured to obtain a processing delay for handover (HO) with primary secondary cell (PSCell). The processing delay performance unit 420 may be configured to perform a procedure of the HO with PSCell based on the obtained processing delay for the HO with PSCell.

Figure 5:
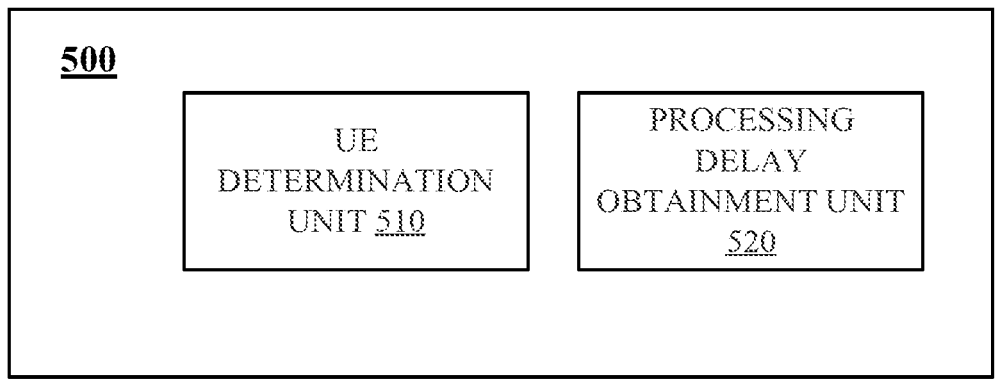
FIG. 5 illustrates an exemplary block diagram of an apparatus for a base station in accordance with some embodiments.

FIG. 5 illustrates an exemplary block diagram of an apparatus for a base station in accordance with some embodiments. The apparatus 500 illustrated m FIG. 5 may be used to implement the method 300 as illustrated in combination with FIG. 3.

As illustrated in FIG. 5, the apparatus 500 includes a UE determination unit 510 and a processing delay obtainment unit 520.

Figure 6:
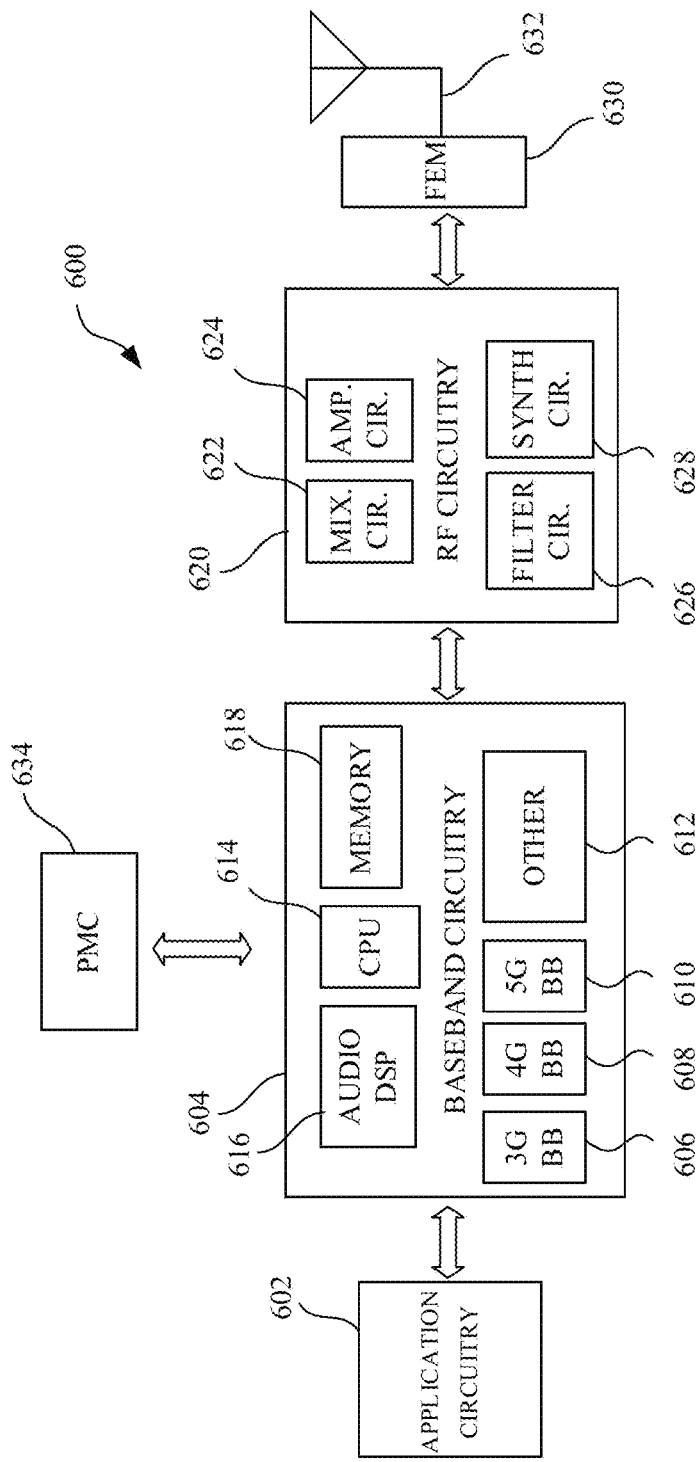
FIG. 6 illustrates example components of a communication device (e.g., a UE or a base station) in accordance with some embodiments.

The UE determination unit 510 may be configured to determine a user equipment (UE) to perform a procedure of handover (HO) with primary secondary cell (PSCell). The processing delay obtainment 520 may be configured to obtain a processing delay for the HO with PSCell for the UE FIG. 6 illustrates example components of a device 600 in accordance with some embodiments. In some embodiments, the device 600 may include application circuitry 602, baseband circuitry 604, Radio Frequency (RF) circuitry (shown as RF circuitry 620), front-end module (FEM) circuitry (shown as FEM circuitry 630), one or more antennas 632, and power management circuitry (PMC) (shown as PMC 634) coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (1/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications of operating systems to run on the device 600. In some embodiments, processors of application circuitry 602 may process IP data packets received from an EPC.

The baseband circuitry 604 may include circuitry such as, but not limited to, one or more single-core of multi-core processors. The baseband circuitry 604 may include one or more baseband processors or control logic to process baseband signals received from a receive signal path of the RF circuitry 620 and to generate baseband signals for a transmit signal path of the RF circuitry 620. The baseband circuitry 604 may interface with the application circuitry 602 for generation and processing of the baseband signals and for controlling operations of the RF circuitry 620. For example, in some embodiments, the baseband circuitry 604 may include a third generation (3G) baseband processor (3G baseband processor 606), a fourth generation (4G) baseband processor (4G baseband processor 608), a fifth generation (5G) baseband processor (5G baseband processor 610), or other baseband processor(s) 612 for other existing generations, generations in development or to be developed in the future (e.g., second generation (2G), sixth generation (6G), etc.). The baseband circuitry 604 (e.g., one or more of baseband processors) may handle various radio control functions that enable communication with one or more radio networks via the RF circuitry 620. In other embodiments, some or all of the functionality of the illustrated baseband processors may be included in modules stored in the memory 618 and executed via a Central Processing ETnit (CPET 614). The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include a digital signal processor (DSP), such as one or more audio DSP(s) 616. The one or more audio DSP(s) 616 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

The RF circuitry 620 may enable communication with wireless networks using modulated electromagnetic radiation through a non-solid medium. In various embodiments, the RF circuitry 620 may include switches, filters, amplifiers, etc. to facilitate the communication with the wireless network. The RF circuitry 620 may include a receive signal path which may include circuitry to down-convert RF signals received from the FEM circuitry 630 and provide baseband signals to the baseband circuitry 604. The RF circuitry 620 may also include a transmit signal path which may include circuitry to up-convert baseband signals provided by the baseband circuitry 604 and provide RF output signals to the FEM circuitry 630 for transmission.

In some embodiments, the receive signal path of the RF circuitry 620 may include mixer circuitry 622, amplifier circuitry 624 and filter circuitry 626. In some embodiments, the transmit signal path of the RF circuitry 620 may include filter circuitry 626 and mixer circuitry 622. The RF circuitry 620 may also include synthesizer circuitry 628 for synthesizing a frequency for use by the mixer circuitry 622 of the receive signal path and the transmit signal path. In some embodiments, the mixer circuitry 622 of the receive signal path may be configured to down-convert RF signals received from the FEM circuitry 630 based on the synthesized frequency provided by synthesizer circuitry 628. The amplifier circuitry 624 may be configured to amplify the down-converted signals and the filter circuitry 626 may be a low-pass filter (LPF) ox band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, the mixer circuitry 622 of the receive signal path may comprise passive mixers, although the scope of the embodiments is not limited in this respect.

In some embodiments, the mixer circuitry 622 of the transmit signal path may be configured to up-convert input baseband signals based on the synthesized frequency provided by the synthesizer circuitry 628 to generate RF output signals for the FEM circuitry 630. The baseband signals may be provided by the baseband circuitry 604 and may be filtered by the filter circuitry 626.

In some embodiments, the mixer circuitry 622 of the receive signal path and the mixer circuitry 622 of the transmit signal path may include two or more mixers and may be arranged for quadrature downconversion and upconversion, respectively. In some embodiments, the mixer circuitry 622 of the receive signal path and the mixer circuitry 622 of the transmit signal path may include two or more mixers and may be arranged for image rejection (e.g., Hartley image rejection). In some embodiments, the mixer circuitry 622 of the receive signal path and the mixer circuitry 622 may be arranged for direct downconversion and direct upconversion, respectively. In some embodiments, the mixer circuitry 622 of the receive signal path and the mixer circuitry 622 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 620 may include analog-to-digital converter (ADC) and digital-to-analog converter (DAC) circuitry and the baseband circuitry 604 may include a digital baseband interface to communicate with the RF circuitry 620.

In some dual-mode embodiments, a separate radio IC circuitry may be provided for processing signals for each spectrum, although the scope of the embodiments is not limited in this respect.

In some embodiments, the synthesizer circuitry 628 may be a fractional –N synthesizer ox a fractional N/N+1 synthesizer, although the scope of the embodiments is not limited in this respect as other types of frequency synthesizers may be suitable. For example, synthesizer circuitry 628 may be a delta-sigma synthesizer, a frequency multiplier, or a synthesizer comprising a phase-locked loop with a frequency divider.

The synthesizer circuitry 628 may be configured to synthesize an output frequency for use by the mixer circuitry 622 of the RF circuitry 620 based on a frequency input and a divider control input. In some embodiments, the synthesizer circuitry 628 may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602 (such as an applications processor) depending on the desired output frequency. In some embodiments, a divider control input (e.g., N) may be determined from a look-up table based on a channel indicated by the application circuitry 602.

Synthesizer circuitry 628 of the RF circuitry 620 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 628 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (ILO). In some embodiments, the RF circuitry 620 may include an IQ/polar converter.

The FEM circuitry 630 may include a receive signal path which may include circuitry configured to operate on RF signals received from one or more antennas 632, amplify the received signals and provide the amplified versions of the received signals to the RF circuitry 620 for further processing. The FEM circuitry 630 may also include a transmit signal path which may include circuitry configured to amplify signals for transmission provided by the RF circuitry 620 for transmission by one or more of the one or more antennas 632. In various embodiments, the amplification through the transmit or receive signal paths may be done solely in the RF circuitry 620, solely in the FEM circuitry 630, or in both the RF circuitry 620 and the FEM circuitry 630.

In some embodiments, the FEM circuitry 630 may include a TX/RX switch to switch between transmit mode and receive mode operation. The FEM circuitry 630 may include a receive signal path and a transmit signal path. The receive signal path of the FEM circuitry 630 may include an LNA to amplify received RF signals and provide the amplified received RF signals as an output (e.g., to the RF circuitry 620). The transmit signal path of the FEM circuitry 630 may include a power amplifier (PA) to amplify input RF signals (e.g., provided by the RF circuitry 620), and one or more filters to generate RF signals for subsequent transmission (e.g., by one of more of the one or more antennas 632).

In some embodiments, the PMC 634 may manage power provided to the baseband circuitry 604. In particular, the PMC 634 may control power-source selection, voltage scaling, battery charging, or DC-to-DC conversion. The PMC 634 may often be included when the device 600 is capable of being powered by a battery, for example, when the device 600 is included in a UE. The PMC 634 may increase the power conversion efficiency while providing desirable implementation size and heat dissipation characteristics.

FIG. 6 shows the PMC 634 coupled only with the baseband circuitry 604. However, in other embodiments, the PMC 634 may be additionally or alternatively coupled with, and perform similar power management operations for, other components such as, but not limited to, the application circuitry 602, the RF circuitry 620, or the FEM circuitry 630.

In some embodiments, the PMC 634 may control, or otherwise be part of, various power saving mechanisms of the device 600. For example, if the device 600 is in an RRC Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
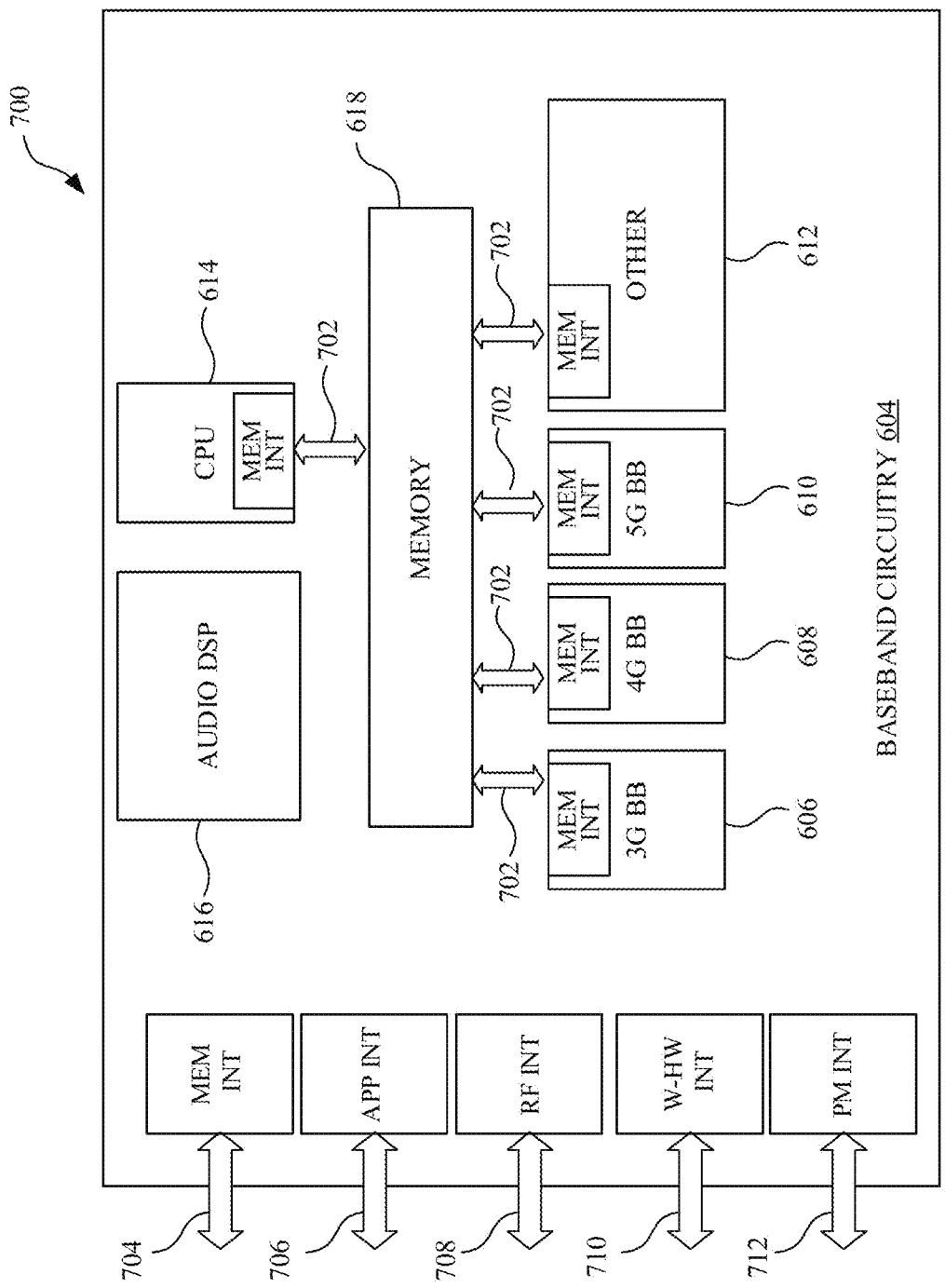
FIG. 7 illustrates example interfaces of baseband circuitry in accordance with some embodiments.

FIG. 7 illustrates example interfaces 700 of baseband circuitry in accordance with some embodiments. As discussed above, the baseband circuitry 604 of FIG. 6 may comprise 3G baseband processor 606, 4G baseband processor 608, 5G baseband processor 610, other baseband processor(s) 612, CPU 614, and a memory 618 utilized by said processors. As illustrated, each of the processors may include a respective memory interface 1402 to send/receive data to/from the memory 618.

The baseband circuitry 604 may further include one or more interfaces to communicatively couple to other circuitries/devices, such as a memory interface 704 (e.g., an interface in send/receive data to/from memory external to the baseband circuitry 604), an application circuitry interface 706 (e.g., an interface to send/receive data to/from the application circuitry 602 of FIG. 6), an RF circuitry interface 708 (e.g., an interface to send/receive data to/from RF circuitry 620 of FIG. 6), a wireless hardware connectivity interface 710 (e.g., an interface to send/receive data to/from Near Field Communication (NFC) components, Bluetooth® components (e.g., Bluetooth® Low Energy), Wi-Fi components, and other communication components), and a power management interface 712 (e.g., an interface to send/receive power or control signals to/from the PMC 634.

Figure 8:
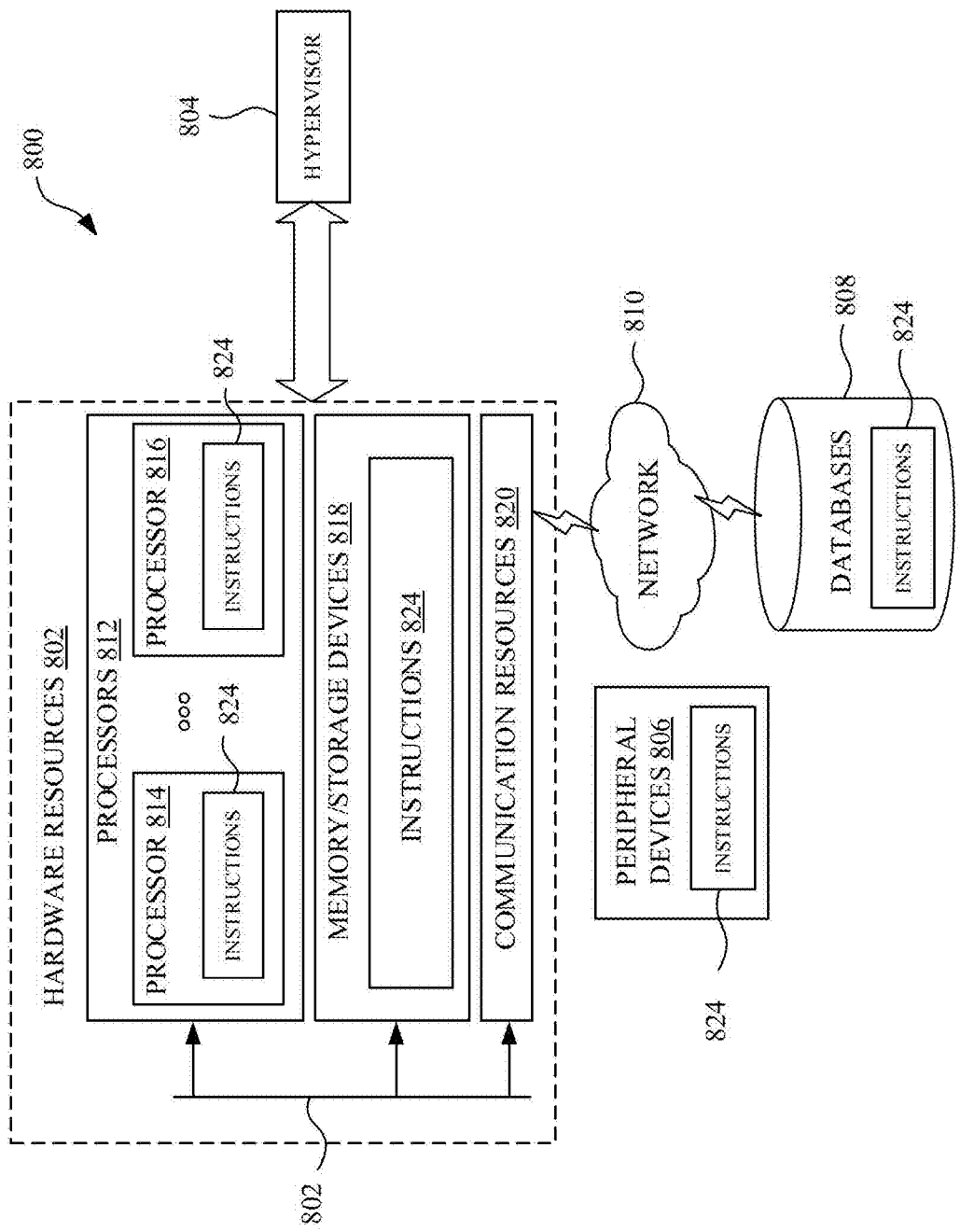
FIG. 8 illustrates components in accordance with some embodiments.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 812 (or processor cores), one or more memory/storage devices 818, and one or more communication resources 820, each of which may be communicatively coupled via a bus 822. For embodiments where node virtualization (e.g., NFV) is utilized, a hypervisor 804 may be executed to provide an execution environment for one or more network slices/sub-slices to utilize the hardware resources 802.

The processors 812 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 814 and a processor 816.

The memory/storage devices 818 may include main memory, disk storage, or any suitable combination thereof. The memory/storage devices 818 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 820 may include interconnection or network interface components or other suitable devices to communicate with one or more peripheral devices 806 of one or more databases 808 via a network 810. For example, the communication resources 820 may include wired communication components (e.g., fox coupling via a Universal Serial Bus (USB)), cellular communication components, NFC components, Bluetooth® components (e.g., Bluetooth® Low Energy), Wi-Fit components, and other communication components.

Instructions 824 may comprise software, a program, an application, an applet, an app, of other executable code for causing at least any of the processors 812 to perform any one or more of the methodologies discussed herein. The instructions 824 may reside, completely or partially, within at least one of the processors 812 (e.g., within the processor's cache memory), the memory/storage devices 818, or any suitable combination thereof. Furthermore, any portion of the instructions 834 may be transferred to the hardware resources 802 from any combination of the peripheral devices 806 or the databases 808. Accordingly, the memory of the processors 812, the memory/storage devices 818, the peripheral devices 806, and the databases 808 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 9:
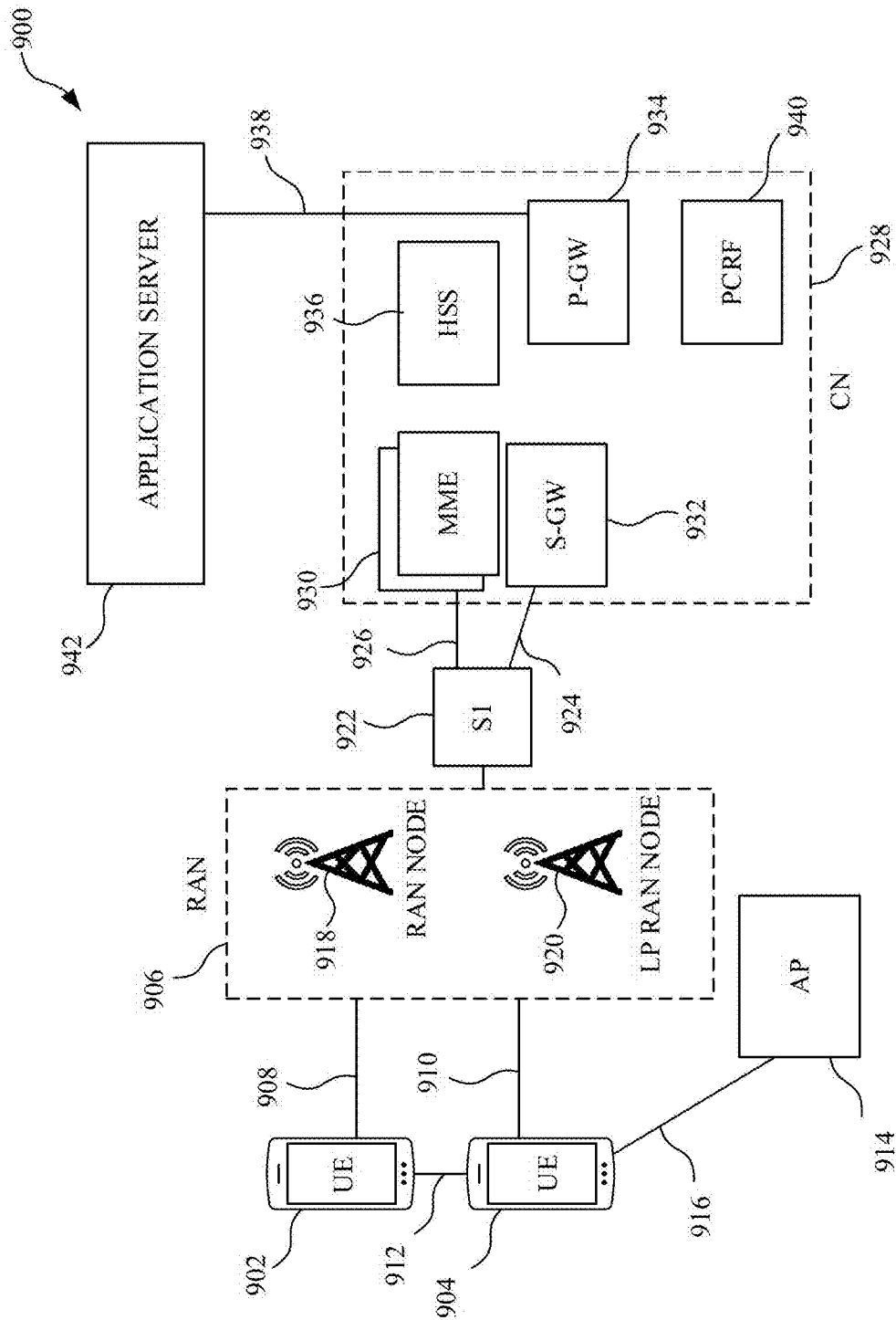
FIG. 9 illustrates an architecture of a wireless network in accordance with some embodiments.

FIG. 9 illustrates an architecture of a system 900 of a network in accordance with some embodiments. The system 900 includes one or more user equipment (UE), shown in this example as a UE 902 and a UE 904. The UE 902 and the UE 904 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 902 and the UE 904 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) ox device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the lol network.

The UE 902 and the UE 904 may be configured to connect, e.g., communicatively couple, with a radio access network (RAN), shown as RAN 906. The RAN 906 may be, for example, an Evolved ETniversal Mobile Telecommunications System (ETMTS) Terrestrial Radio Access Network (E-UTRAN), a NextGen RAN (NG RAN), or some other type of RAN. The DE 902 and the UE 904 utilize connection 908 and connection 910, respectively, each of which comprises a physical communications interface or layer (discussed in further detail below); in this example, the connection 908 and the connection 910 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE; protocol, a fifth generation (5G) protocol, a New Radio (NR) protocol, and the like.

In this embodiment, the UE 902 and the UE 904 may further directly exchange communication data via a ProSe interface 912. The ProSe interface 912 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 904 is shown to be configured to access an access point (AP), shown as AP 914, via connection 916. The connection 916 can comprise a local wireless connection, such as a connection consistent with any IEEE 802.11 protocol, wherein the AP 914 would comprise a wireless fidelity (WiFi®) router. In this example, the AP 914 may be connected to the Internet without connecting to the core network of the wireless system (described in further detail below).

The RAN 906 can include one or more access nodes that enable the connection 908 and the connection 910. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 906 may include one or more RAN nodes for providing macrocells, e.g., macro RAN node 918, and one or more RAN nodes for providing femtocells or picocells (e.g., cells having smaller coverage areas, smaller user capacity, or higher bandwidth compared to macrocells), e.g., a low power (LP) RAN node such as LP RAN node 920.

Any of the macro RAN node 918 and the (LP) RAN node 920 can terminate the air interface protocol and can be the first point of contact for the UE 902 and the UE 904. In some embodiments, any of the macro RAN node 918 and the LP RAN node 920 can fulfill various logical functions for the RAN 906 including, but not limited to, radio network controller (RNC) functions such as radio bearer management, uplink and downlink dynamic radio resource management and data packet scheduling, and mobility management.

In accordance with some embodiments, the UE 902 and the UE 904 can be configured to communicate using Orthogonal Frequency-Division Multiplexing (OFDM) communication signals with each other or with any of the macro RAN node 918 and the LP RAN node 920 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 918 and the LP RAN node 920 to the UE 902 and the UE 904, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that axe conveyed using such resource blocks.

The physical downlink shared channel (PDSCH) may carry user data and higher-layer signaling to the UE 902 and the UE 904. The physical downlink control channel (PDCCH) may carry information about the transport format and resource allocations related to the PDSCH channel, among other things. It may also inform the UE 902 and the UE 904 about the transport format, resource allocation, and H-ARQ (Hybrid Automatic Repeat Request) information related to the uplink shared channel. Typically, downlink scheduling (assigning control and shared channel resource blocks to the UE 904 within a cell may be performed at any of the macro RAN node 918 and the LP RAN node 920 based on channel quality information fed back from any of the UE 902 and UE 904. The downlink resource assignment information may be sent on the PDCCH used for (e.g., assigned to) each of the UE 902 and the UE 904.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink, control information (DCT) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations The RAN 906 is communicatively coupled to a core network (CN), shown as CN 928—via an S1 interface 922. In embodiments, the CN 928 may be an evolved packet core (EPC) network, a NextGen Packet Core (NPC) network, or some other type of CN. In this embodiment the S1 interface 922 is split into two parts: the S1-U interface 1124, which carries traffic data between the macro RAN node 918 and the LP RAN node 920 and a serving gateway (S-GW), shown as S-GW 1 132, and an S1-mobility management entity (MME) interface, shown as S1-MME interface 926, which is a signaling interface between the macro RAN node 918 and LP RAN node 920 and the MME(s) 930.

In this embodiment, the CN 928 comprises the MME(s) 930, the S-GW 932, a Packet Data Network (PDN) Gateway (P-GW) (shown as P-GW 934), and a home subscriber server (HSS) (shown as HSS 936). The MME(s) 930 may be similar in function to the control plane of legacy Serving General Packet Radio Service (GPRS; Support Nodes (SGSN). The MME(s) 930 may manage mobility aspects in access such as gateway selection and tracking area list management. The HSS 936 may comprise a database for network users, including subscription-related information to support the network entities' handling of communication sessions. The ON 928 may comprise one or several HSS 936, depending on the number of mobile subscribers, on the capacity of the equipment, on the organization of the network, etc. For example, the HSS 936 can provide support for routing/roaming, authentication, authorization, naming/addressing resolution, location dependencies, etc.

The S-GW 932 may terminate the S1 interface 322 towards the RAN 906, and routes data packets between the RAN 906 and the CN 928. In addition, the S-GW 932 may be a local mobility anchor point for inter-RAN node handovers and also may provide an anchor for inter-3 GPP mobility. Other responsibilities may include lawful intercept, charging, and some policy enforcement.

The P-GW 934 may terminate an SGi interface toward a PDN. The P-GW 934 may route data packets between the CN 928 (e.g., an EPC network) and external networks such as a network including the application server 942 (alternatively referred to as application function (AF)) via an Internet Protocol (IP) interface (shown as IP communications interface 938). Generally, an application server 942 may be an element offering applications that use IP bearer resources with the core network (e.g., ETMTS Packet Services (PS) domain. LTE PS data services, etc.). In this embodiment, the P-GW 934 is shown to be communicatively coupled to an application server 1 142 via an IP communications interface 938. The application server 942 can also be configured to support one or more communication services (e.g., Voice-over-Internet Protocol (VoIP) sessions. PTT sessions, group communication sessions, social networking services, etc.) for the UE 902 and the UE 904 via the CN 928.

The P-GW 934 may further be a node for policy enforcement and charging data collection. A Policy and Charging Enforcement Function (PCRF) (shown as PCRF 940) is the policy and charging control element of the CN 928. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 940 may be communicatively coupled to the application server 942 via the P-GW 934. The application server 942 may signal the PCRF 940 to indicate a new service flow and select the appropriate Quality of Service (QOS) and charging parameters. The PCRF 940 may provision this rule into a Policy and Charging Enforcement Function (PCEF) (not shown) with the appropriate traffic flow template (TFT) and QoS class of identifier (QCI), which commences the QoS and charging as specified by the application server 942.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising:
  obtaining a processing delay for handover (HO) with primary secondary cell (PSCell); and
  performing a procedure of the HO with PSCell based on the obtained processing delay for the HO with PSCell Example 2 is the method of Example 1, wherein the processing delay for the HO with PSCell comprises a radio resource control (RRC) procedure delay for the HO with PSCell.

Example 3 is the method of Example 2, wherein the RRC procedure delay for the HO with PSCell is obtained by
  receiving, from a network device, a first RRC procedure delay determined based on an RRC procedure delay for a separate procedure of HO between a source primary cell (PCell) and a target PCell of the HO with PSCell, and an RRC procedure delay for a separate procedure of PSCell change/addition for the target PSCell of the HO with PSCell; and
  determining the received first RRC procedure delay as the RRC procedure delay for the HO with PSCell.

Example 4 is the method of Example 3, wherein the first RRC procedure delay is determined to be one of:
  a maximum value of the RRC procedure delay for the separate procedure of HO and the RRC procedure delay for the separate procedure of PSCell change/addition;
  a sure value of the RRC procedure delay for the separate procedure of HO and the RRC procedure delay for the separate procedure of PSCell change/addition;
  a predefined value between the RRC procedure delay for the separate procedure of HO and the RRC procedure delay for the separate procedure of PSCell change/addition; and
  a minimum value of the RRC procedure delay for the separate procedure of HO and the RRC procedure delay for the separate procedure of PSCell change/addition.

Example 5 is the method of Example 2, wherein the RRC procedure delay for the HO with PSCell is obtained by:
  determining a second RRC procedure delay based on a processing capability of the UE; and
  determining the second RRC procedure delay as the RRC procedure delay for the HO with PSCell.

Example 6 is the method of Example 5, wherein the second RRC procedure delay is determined by the UE based on one of the following manners:
  per UE basis;
  per band-combination of the HO with PSCell basis; and
  per scenario mode of the HO with PSCell basis.

Example 7 is the method of Example 6, wherein the scenario mode of the HO with PSCell comprises one of:
  New Radio (NR) standalone (SA) to Evolved Universal Terrestrial Radio Access (E-UTRA)-NR Dual Connectivity (EN-DC);
  EN-DC to EN-DC;
  NR-E-UTRA Dual Connectivity (NE-DC) to NE-DC; and
  NR-NR Dual Connectivity (NR-DC) to NR-DC.

Example 8 is the method of Example 5, further comprising:
  generating, for transmission to a network device, an indication for indicating the second RRC procedure delay.

Example 9 is the method of Example 1, wherein the processing delay for the HO with PSCell comprises a UE processing delay for the HO with PSCell.

Example 10 is the method of Example 9, wherein the UE processing delay for the HO with PSCell is obtained by:
  receiving, from a network device, a first UE processing delay determined based on a UE processing delay for a separate procedure of HO between a source PCell and a target PCell of the HO with PSCell, and a UE processing delay for a separate procedure of PSCell change/addition for the target PSCell of the HO with PSCell; and
  determining the received first UE processing delay as the UE processing delay for the HO with PSCell.

Example 11 is the method of Example 10, wherein the first UE processing delay for the HO with PSCell is determined to be one of:
  a maximum value of the UE processing delay for the separate procedure of HO and the UE processing delay for the separate procedure of PSCell change/addition; and
  a sum value of the UE processing delay for the separate procedure of HO and the UE processing delay for the separate procedure of PSCell change/addition.

Example 12 is the method of Example 11, wherein when the target PCell is in the same frequency range (FR) as one of at least one old active serving cell of the UE before the HO with PSCell, the UE processing delay for the separate procedure of HO has a first value, otherwise the UE processing delay for the separate procedure of HO has a second value greater than the first value;
  when the target PSCell is in the same FR as one of the at least one old active serving cell of the UE before the HO with PSCell or as the target PCell, the UE processing delay for the separate procedure of PSCell change/addition has the first value, otherwise the UE processing delay for the separate procedure of PSCell change/addition has the second value; and
  when the target PSCell is a long-term evolution (LTE) cell, the UE processing delay for the HO with PSCell is equivalent to the UE processing delay for the separate procedure of HO.

Example 13 is the method of Example 12, wherein the at least one old active serving cell of the UE comprises the source PCell of the UE.

Example 14 is the method of Example 10, wherein the first UE processing delay for the HO with PSCell is determined to be:
  a predefined value between a first value and a second value greater than the first value, wherein the first value and the second value are determined based on the UE processing delay for the separate procedure of HO and the UE processing delay for the separate procedure of PSCell change/addition.

Example 15 is the method of Example 9, wherein the UE processing delay for the HO with PSCell is obtained by:
  determining a second UE processing delay based on a processing capability of the UE; and
  determining the second UE processing delay as the UE processing delay for the HO with PSCell.

Example 16 is the method of Example 15, wherein the second UE processing delay is determined by the UE based on one of the following manners:
  per UE basis;
  per band-combination of the HO with PSCell basis; and
  per scenario mode of the HO with PSCell basis.

Example 17 is the method of Example 16, wherein the scenario mode of the HO with PSCell comprises one of:
New Radio (NR) standalone (SA) to Evolved Universal Terrestrial Radio Access (E-UTRA)-NR Dual Connectivity (EN-DC);
EN-DC to EN-DC;
NR-E-UTRA Dual Connectivity (NE-DC) to NE-DC; and
NR-NR Dual Connectivity (NR-DC) to NR-DC.

Example 18 is the method of Example 15, further comprising:
generating, for transmission to a network device, an indication for indicating the second UE processing delay.

Example 19 is a method for a base station, comprising:
determining a user equipment (UE) to perform a procedure of handover (HO) with primary secondary cell (PSCell); and
obtaining a processing delay for the HO with PSCell for the UE.

Example 20 is the method of Example 19, wherein the processing delay for the HO with PSCell comprises a radio resource control (RRC) procedure delay for the HO with PSCell.

Example 21 is the method of Example 20, wherein the RRC procedure delay for the HO with PSCell is obtained by:
determining a first RRC procedure delay based on an RRC procedure delay for a separate procedure of HO between a source primary cell (PCell) and a target PCell of the HO with PSCell, and an RRC procedure delay for a separate procedure of PSCell change/addition for the target PSCell of the HO with PSCell; and
determining the first RRC procedure delay as the RRC procedure delay for the HO with PSCell.

Example 22 is the method of Example 21, wherein the first RRC procedure delay is determined by the base station to be one of:
a maximum value of the RRC procedure delay for the separate procedure of HO and the RRC procedure delay fox the separate procedure of PSCell change/addition;
a sum value of the RRC procedure delay for the separate procedure of HO and the RRC procedure delay for the separate procedure of PSCell change/addition;
a predefined value between the RRC procedure delay for the separate procedure of HO and the RRC procedure delay for the separate procedure of PSCell change/addition; and
a minimum value of the RRC procedure delay for the separate procedure of HO and the RRC procedure delay for the separate procedure of PSCell change/addition.

Example 23 is the method of Example 20, wherein the RRC procedure delay for the HO with PSCell is obtained by:
receiving, from the UE, a second RRC procedure delay determined by the UE based on a processing capability of the UE; and
determining the second RRC procedure delay as the RRC procedure delay for the HO with PSCell.

Example 24 is the method of Example 23, wherein the second RRC procedure delay is determined by the UE based on one of the following manners:
per UE basis;
per band-combination of the HO with PSCell basis; and
per scenario mode of the HO with PSCell basis.

Example 25 is the method of Example 24, wherein the scenario mode of the HO with PSCell comprises one of:
New Radio (NR; standalone (SA) to Evolved Universal Terrestrial Radio Access (E-UTRA)-NR Dual Connectivity (EN-DC);
EN-DC to EN-DC;
NR-E-UTRA Dual Connectivity (NB-DC) to NE-DC, and
NR-NR Dual Connectivity (NR-DC) to NR-DC.

Example 26 is the method of Example 23, wherein receiving, from the UE, the second RRC procedure delay comprises:
receiving, from the UE, an indication for indicating the second RRC procedure delay.

Example 27 is the method of Example 19, wherein the processing delay for the HO with PSCell comprises a UE processing delay for the HO with PSCell.

Example 28 is the method of Example 27, wherein the UE processing delay for the HO with PSCell is obtained by:
determining a first UE processing delay based on a UE processing delay for a separate procedure of HO between a source primary cell (PCell) and a target PCell of the HO with PSCell, and a UE processing delay for a separate procedure of PSCell change/addition for the target PSCell of the HO with PSCell; and
determining the first UE processing delay as the UE processing delay for the HO with PSCell.

Example 29 is the method of Example 28, wherein the first UE processing delay for the HO with PSCell is determined by the base station to be one of:
a maximum value of the UE processing delay for the separate procedure of HO and the UE processing delay for the separate procedure of PSCell change/addition; and
a sum value of the UE processing delay for the separate procedure of HO and the UE processing delay for the separate procedure of PSCell change/addition.

Example 30 is the method of Example 29, wherein when the target PCell is in the same frequency range (FR) as one of at least one old active serving cell of the UE before the HO with PSCell, the UE processing delay for the separate procedure of HO has a first value, otherwise the UE processing delay for the separate procedure of HO has a second value greater than the first value;
when the target PSCell is in the same FR as one of the at least one old active serving cell of the UE before the HO with PSCell or as the target PCell, the UE processing delay for the separate procedure of PSCell change/addition has the first value, otherwise the UE processing delay for the separate procedure of PSCell change/addition has the second value; and
when the target PSCell is a long-term evolution (LTE) cell, the UE processing delay for the HO with PSCell is equivalent to the UE processing delay for the separate procedure of HO.

Example 31 is the method of Example 30, wherein the at least one old active serving cell of the UE comprises the source PCell of the UE.

Example 32 is the method of Example 28, wherein the first UE processing delay for the HO with PSCell is determined by the base station to be:
a predefined value between a first value and a second value greater than the first value, wherein the first value and the second valve are determined based on the UE processing delay for the separate procedure of HO and the UE processing delay for the separate procedure of PSCell change/addition.

Example 33 is the method of Example 27, wherein the UTE processing delay for the HO with PSCell is obtained by:
receiving, from the UE, a second UE processing delay determined by the UE based on a processing capability of the UE, and determining the second UE processing delay as the UE processing delay for the HO with PSCell.

Example 34 is the method of Example 33, wherein the second UE processing delay is determined by the UE based on one of the following manners:
- per UE basis;
- per band-combination of the HO with PSCell basis; and
- per scenario mode of the HO with PSCell basis.

Example 35 is the method of Example 34, wherein the scenario mode of the HO with PSCell comprises one of:
- New Radio (NR) standalone (SA) to Evolved Universal Terrestrial Radio Access (E-UTRA)-NR Dual Connectivity (EN-DC);
- EN-DC to EN-DC;
- NR-E-UTRA Dual Connectivity (NE-DC) to NE-DC; and
- NR-NR Dual Connectivity (NR-DC) to NR-DC.

Example 36 is the method of Example 33, wherein receiving, from the UE, the second UE processing delay comprises:
- receiving, from the UE, an indication for indicating the second UE processing delay.

Example 37 is an apparatus for a user equipment (UE), the apparatus comprising:
- one or more processors configured to perform steps of the method according to any of Examples 1-18.

Example 38 is an apparatus for a base station, the apparatus comprising:
- one or more processors configured to perform steps of the method according to any of Examples 19-36.

Example 39 is a computer readable medium having computer programs stored thereon which, when executed by one or more processors, cause an apparatus to perform steps of the method according to any of Examples 1-36.

Example 40 is an apparatus for a communication device, comprising means for performing steps of the method according to any of Examples 1-36.

Example 41 is a computer program product comprising computer programs which, when executed by one or more processors, cause an apparatus to perform steps of the method according to any of Examples 1-36.

Any of the above-described examples may be combined with any other example (of combination of examples), unless explicitly stated otherwise. The foregoing description of one of more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition. It is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), comprising:
   obtaining a processing delay for handover (HO) with primary secondary cell (PSCell), wherein the processing delay for the HO with PSCell comprises a UE processing delay for the HO with PSCell; and
   performing a procedure of the HO with PSCell based on the obtained processing delay for the HO with PSCell.

2. The method of claim 1, wherein the processing delay for the HO with PSCell comprises a radio resource control (RRC) procedure delay for the HO with PSCell.

3. The method of claim 2, wherein the RRC procedure delay for the HO with PSCell is obtained by:
   receiving, from a network device, a first RRC procedure delay determined based on an RRC procedure delay for a separate procedure of HO between a source primary cell (PCell) and a target PCell of the HO with PSCell, and an RRC procedure delay for a separate procedure of PSCell change/addition for the target PSCell of the HO with PSCell; and
   determining the received first RRC procedure delay as the RRC procedure delay for the HO with PSCell.

4. The method of claim 3, wherein the first RRC procedure delay is determined to be one of:
   a maximum value of the RRC procedure delay for the separate procedure of HO and the RRC procedure delay for the separate procedure of PSCell change/addition;
   a sum value of the RRC procedure delay for the separate procedure of HO and the RRC procedure delay for the separate procedure of PSCell change/addition;
   a predefined value between the RRC procedure delay for the separate procedure of HO and the RRC procedure delay for the separate procedure of PSCell change/addition; and
   a minimum value of the RRC procedure delay for the separate procedure of HO and the RRC procedure delay for the separate procedure of PSCell change/addition.

5. The method of claim 2, wherein the RRC procedure delay for the HO with PSCell is obtained by:
   determining a second RRC procedure delay based on a processing capability of the UE; and
   determining the second RRC procedure delay as the RRC procedure delay for the HO with PSCell.

6. The method of claim 5, wherein the second RRC procedure delay is determined by the UE based on one of the following manners:
   per UE basis;
   per band-combination of the HO with PSCell basis; and
   per scenario mode of the HO with PSCell basis.

7. The method of claim 6, wherein the scenario mode of the HO with PSCell comprises one of:
   New Radio (NR) standalone (SA) to Evolved Universal Terrestrial Radio Access (E-UTRA)-NR Dual Connectivity (EN-DC);
   EN-DC to EN-DC;

NR-E-UTRA Dual Connectivity (NE-DC) to NE-DC; and
NR-NR Dual Connectivity (NR-DC) to NR-DC.

8. The method of claim 5, further comprising:
generating, for transmission to a network device, an indication for indicating the second RRC procedure delay.

9. The method of claim 1, wherein the UE processing delay for the HO with PSCell is obtained by:
receiving, from a network device, a first UE processing delay determined based on a UE processing delay for a separate procedure of HO between a source PCell and a target PCell of the HO with PSCell, and a UE processing delay for a separate procedure of PSCell change/addition for the target PSCell of the HO with PSCell; and
determining the received first UE processing delay as the UE processing delay for the HO with PSCell.

10. The method of claim 9, wherein the first UE processing delay for the HO with PSCell is determined to be one of:
a maximum value of the UE processing delay for the separate procedure of HO and the UE processing delay for the separate procedure of PSCell change/addition; and
a sum value of the UE processing delay for the separate procedure of HO and the UE processing delay for the separate procedure of PSCell change/addition.

11. The method of claim 10, wherein when the target PCell is in the same frequency range (FR) as one of at least one old active serving cell of the UE before the HO with PSCell, the UE processing delay for the separate procedure of HO has a first value, otherwise the UE processing delay for the separate procedure of HO has a second value greater than the first value;
when the target PSCell is in the same FR as one of the at least one old active serving cell of the UE before the HO with PSCell or as the target PCell, the UE processing delay for the separate procedure of PSCell change/addition has the first value, otherwise the UE processing delay for the separate procedure of PSCell change/addition has the second value; and
when the target PSCell is a long-term evolution (LTE) cell, the UE processing delay for the HO with PSCell is equivalent to the UE processing delay for the separate procedure of HO.

12. The method of claim 11, wherein the at least one old active serving cell of the UE comprises the source PCell of the UE.

13. The method of claim 9, wherein the first UE processing delay for the HO with PSCell is determined to be:
a predefined value between a first value and a second value greater than the first value, wherein the first value and the second value are determined based on the UE processing delay for the separate procedure of HO and the UE processing delay for the separate procedure of PSCell change/addition.

14. The method of claim 1, wherein the UE processing delay for the HO with PSCell is obtained by:
determining a second UE processing delay based on a processing capability of the UE; and
determining the second UE processing delay as the UE processing delay for the HO with PSCell.

15. The method of claim 14, wherein the second UE processing delay is determined by the UE based on one of the following manners:
per UE basis;
per band-combination of the HO with PSCell basis; and
per scenario mode of the HO with PSCell basis.

16. The method of claim 15, wherein the scenario mode of the HO with PSCell comprises one of:
New Radio (NR) standalone (SA) to Evolved Universal Terrestrial Radio Access (E-UTRA)-NR Dual Connectivity (EN-DC);
EN-DC to EN-DC;
NR-E-UTRA Dual Connectivity (NE-DC) to NE-DC; and
NR-NR Dual Connectivity (NR-DC) to NR-DC.

17. The method of claim 14, further comprising:
generating, for transmission to a network device, an indication for indicating the second UE processing delay.

18. A method for a base station, comprising:
determining a user equipment (UE) to perform a procedure of handover (HO) with primary secondary cell (PSCell); and
obtaining a processing delay for the HO with PSCell for the UE wherein the processing delay for the HO with PSCell comprises a UE processing delay for the HO with PSCell.

19. The method of claim 18, wherein the processing delay for the HO with PSCell comprises a radio resource control (RRC) procedure delay for the HO with PSCell.

* * * * *